UNITED STATES PATENT OFFICE.

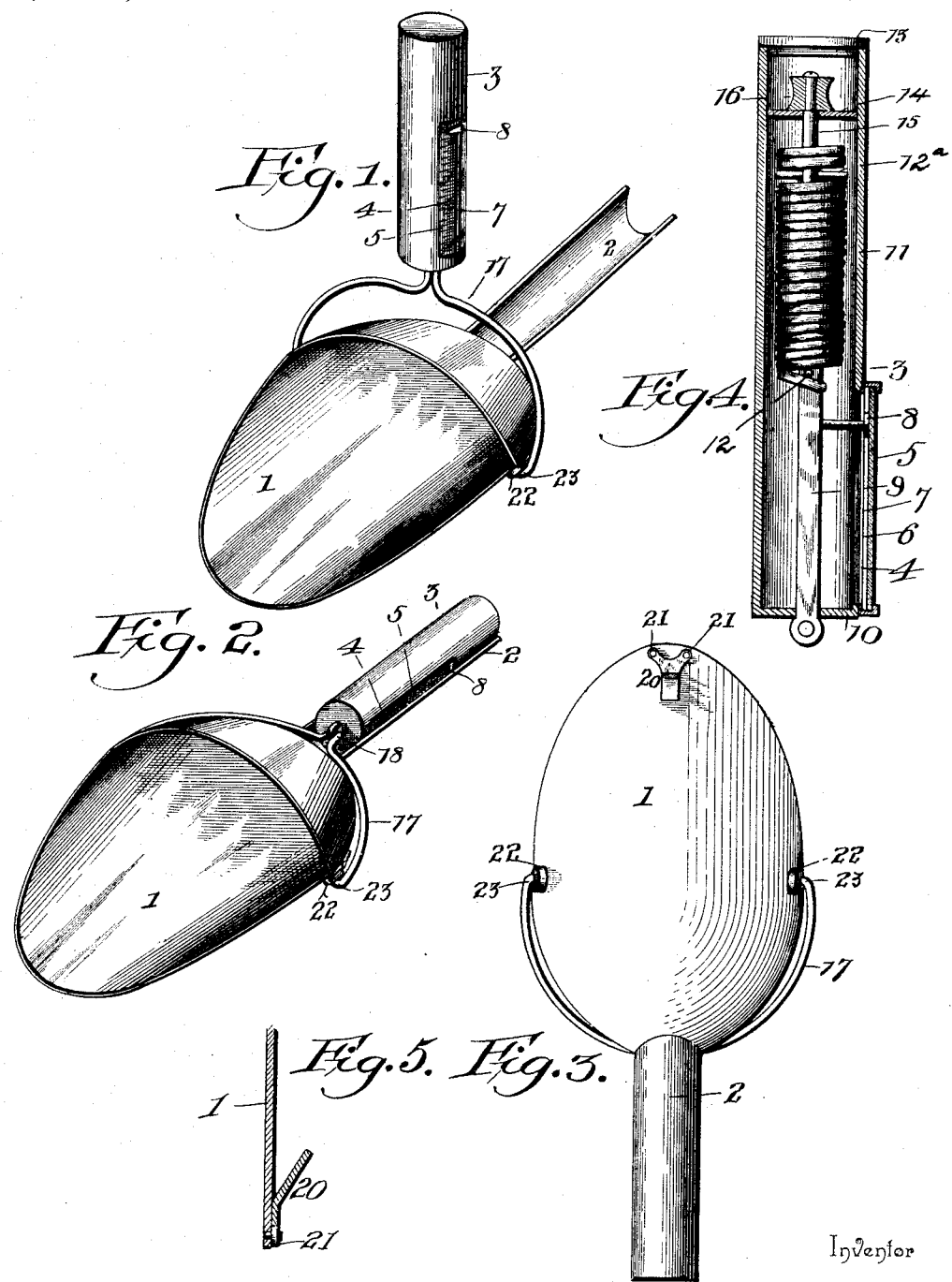

GUS KOHN, OF MAGNOLIA, ARKANSAS.

SCOOP-SCALE.

SPECIFICATION forming part of Letters Patent No. 619,422, dated February 14, 1899.

Application filed August 13, 1897. Serial No. 648,181. (No model.)

*To all whom it may concern:*

Be it known that I, GUS KOHN, a citizen of the United States, residing at Magnolia, in the county of Columbia and State of Arkansas, have invented a new and useful Scoop-Scale, of which the following is a specification.

My invention relates to improvements in scoop-scales; and the primary object is to provide in one implement means for determining the weight of the contents of the scoop, the handle of the scoop being constructed to receive the weighing-scale in a manner to have the parts fold compactly together, and thus enable the scoop to be used without interference with the weighing attachment.

A further object of the invention is to construct the weighing attachment in a manner to present the dial or scale plate to the view of the operator when the scoop-scale is held by one hand in a raised position, thus enabling the operator to readily determine at a glance the weight of the contents of the scoop.

A further object of the invention is to provide the weighing attachment with means for adjusting the tension of the torsion-spring to compensate for the weight of the scoop, which in the present invention serves the purposes of the scale-pan.

A further object of the invention is to provide a scoop with means for holding the mouth of the bag in an open position for the purpose of enabling the contents of the scoop to be dumped into the bag without liability of having the bag cave or bend in at the rear side and spilling the substance as it is poured from the scoop into the bag.

With these ends in view the invention consists in the novel combination of parts and in the construction and arrangement of devices, which will be hereinafter fully described and claimed.

To enable others to understand the invention, I have illustrated the same in the accompanying drawings, forming a part of this specification, and in which—

Figure 1 is a perspective view showing the scale adjusted for service. Fig. 2 is a perspective view with the scale folded within the hollow or trough-shaped handle of the scoop to permit the scoop to be used without hindrance from the scale. Fig. 3 is an inverted perspective view of a part of the scoop, showing the bag-holding attachment on the reverse face of the scoop. Fig. 4 is an enlarged vertical sectional view through the weighing-scale, showing the means for adjusting the torsion-spring to compensate for the weight of the scoop.

Like numerals of reference denote corresponding parts in all the figures of the drawings.

1 designates the scoop, of ordinary construction, except for the peculiar construction of the handle. The handle 2 of the scoop is of hollow form. I prefer to make this handle trough-shaped for the purpose of receiving within itself the scale attachment. When the scale is folded within the trough-shaped handle, the scale is flush with the handle, and the scoop may be used in the same manner as ordinary scoops without interference from the weighing attachment.

The scale consists of a suitable shell or hollow stock 3, which is provided in one side thereof with a longitudinal slot 4, and over the slot is arranged a transparent pane 5, which is suitably attached to the shell or stock 3, in order to exclude dirt from entering the working parts of the scale and interfering with the free and correct operation thereof. Within the shell or hollow stock of the scale is secured a dial-plate 6, and said plate is provided with a longitudinal slot 7, in which travels an indicator or pointer 8, attached to one end of a slidable stem or bar 9. The hollow stock or shell of the scale is provided at its lower end with a plate or head 10, in an opening in which travels the stem or bar 9. The upper end of the stem or bar 9 is attached to the lower end of the coil torsion-spring 11, and to the upper end of this torsion-spring is connected a transverse pin 12, said pin fitting between adjacent coils near the upper end of said spring. The upper end of the stock or shell of the scale is provided with an internal thread, into which is screwed a removable head or cover 13. Within the shell or stock of the scale, at a suitable distance below the removable head or cover thereof, is secured a cross bar or plate 14.

15 designates an adjusting stem or spindle which passes through an opening in the cross bar or plate 14. This stem or spindle 15 extends within the upper part of the coil-spring, and to its lower end is fastened a cross-pin 12$^a$, thus operatively connecting the adjusting-spindle 15 to the torsion-spring. The upper extremity of the spindle 15, which projects above the cross bar or plate 14, is externally threaded to receive the adjusting-nut 16. This nut provides means for raising the stem or spindle 15 to increase the tension of the torsion-spring, and thus adjust the latter to compensate for the weight of the scoop.

The scale and scoop are connected together by the bail 17. The free ends of the bail are pivotally attached to the sides of the scoop at points a little in the rear of the center of the scoop for the purpose of having the heel or rear end of the scoop slightly overbalance the front open end of the same, thus preventing the scoop from tilting forward and discharging its contents accidentally when the scale and scoop are held up to the view of the operator.

The bail is provided at its middle with a lug or eye 18 to fit in an aperture in the lower end of the slidable indicator bar or stem of the scale.

I provide my scoop with means for engaging with the mouth of the bag in a manner to hold the bag in an open position when the contents of the scoop are to be dumped into the bag. This attachment consists of a plate 20, which is provided at one end with the ears or lugs 21. These ears are provided with suitable apertures for the passage of rivets or other devices, by which the bag-holding plate 20 may be securely attached to the lower face of the scoop. The bag-holding plate is attached to the scoop a short distance—say about one inch—within the front edge of the scoop. Said plate is bent laterally and downwardly away from the lower face of the scoop to provide a tongue, which stands off from the face of the scoop and is adapted to serve as a clasp to receive and hold one edge of the bag between itself and the body of the scoop.

In using my device as a scoop the scale and bail are turned down upon the scoop for the scale to be received within the trough-shaped handle, while the bail fits closely upon the covered rear side of the scoop, at the margin thereof. The scale folds compactly within the trough-shaped handle, and it does not in any way interfere with the operator in grasping the scoop-handle or in manipulating the scoop.

After the scoop has received its load the scale can easily be pulled out of the handle, and the implement may be suspended in one hand by grasping the hollow stock or shell of the scale above the slotted open face thereof. The weight of the contents of the scoop is indicated on the scale or dial plate by the traveling pointer of the slidable indicator-bar. By having the slot in the scale-stock at one side of the stock and arranging the dial-plate immediately in rear of this side slot the operator is able to ascertain at a glance the weight of the contents of the scoop instead of being compelled to turn the whole implement around in order to obtain a view of the dial-plate.

When it is desired to empty the contents of the scoop into a bag, the mouth of the bag is opened and the scoop is slipped into said open mouth of the bag for the holding-plate 20 to receive one edge of the bag, whereby said plate 20 prevents the sack or bag from caving or bending in when the contents of the scoop are emptied into the bag.

From the foregoing description, taken in connection with the drawings, it will be observed that I have provided in one implement a convenient means for scooping up groceries or other substances and for ascertaining the weight of the contents of the scoop. The scoop may be used to good advantage without hindrance from the scale, and the holding-plate on the scoop provides means for holding open the mouth of a bag to enable the contents of the scoop to be deposited in the bag without spilling. The tension-adjusting devices for the torsion-spring of the scale enable scoops of different sizes and weights to be used in connection with the scale, and the bail is detachably connected in any suitable well-known way with the scoop to enable the latter to be used interchangeably in connection with other scoops.

I prefer to provide the sides of the scoop with eye-formed socket-plates 22, which are rigidly attached to the sides of the scoop in position to receive inwardly-bent lugs 23 on the extremities of the suspending-bail 17. This construction provides for the ready attachment of the bail to the scoop, and by spreading or springing out the bail the pivot-lugs 23 may be disconnected from the plates 22, thus enabling other scoops to be easily attached to the bail.

Various changes in the form and proportion of parts may be made without departing from the spirit or sacrificing the advantages of my invention.

Having thus described the invention, what is claimed as new is—

A scoop-scale comprising a scale-pan having a trough-shaped handle secured rigidly to the closed rear end thereof, a tubular stock which is coextensive in length with the handle and of a diameter to fit snugly therein and provided with a viewing-slot opposite to the graduated plate, a bridge-bar, 14, fixed within the stock near the upper closed end thereof, a slidable rod guided in the stock and bridge-bar and having a pin, 12, and a pointer, a nut screwed on the rod and resting upon the bridge-bar, a spring coiled on the rod and bearing against the pin, 12, thereof, a pin, 12$^a$, fixed to the stock and connected to the spring, and a bail attached to the slidable rod and pivoted to the scoop-scale, substantially as described.

In testimony that I claim the foregoing as my own I have hereto affixed my signature in the presence of two witnesses.

GUS KOHN.

Witnesses:
   A. T. DIXON,
   J. R. HARVEY.